United States Patent [19]
Gary et al.

[11] Patent Number: 5,836,172
[45] Date of Patent: Nov. 17, 1998

[54] PROCESS FOR THE PURIFICATION OF A CRYOGENIC FLUID BY FILTRATION AND/OR ADSORPTION

[75] Inventors: Daniel Gary, Montigny-le-Bretonneux; René Lardeau, Saulx-les-Chartreux; Philippe Fraysse, Fontenay-Aux-Roses; Frédéric Castellanet, Le Pecq, all of France

[73] Assignee: L'Air Liquide, Societe Anonyme Pour L'Etude et L'Exploitation des Procedes Georges Claude, Paris Cedex, France

[21] Appl. No.: 967,582

[22] Filed: Nov. 28, 1997

Related U.S. Application Data

[62] Division of Ser. No. 790,362, Jan. 28, 1997.

[30] Foreign Application Priority Data

Dec. 24, 1996 [FR] France ................................... 96 15972

[51] Int. Cl.⁶ .......................................................... F25J 3/08
[52] U.S. Cl. ............................................... 62/608; 62/908
[58] Field of Search ......................................... 62/908, 608

[56] References Cited

U.S. PATENT DOCUMENTS

| | | |
|---|---|---|
| 3,415,069 | 12/1968 | Hauser . |
| 3,616,602 | 11/1971 | Hays et al. ............................. 62/908 X |
| 4,192,661 | 3/1980 | Johnson . |
| 4,417,909 | 11/1983 | Weltmer, Jr. . |
| 4,717,406 | 1/1988 | Giacobbe ............................... 62/908 X |
| 5,425,240 | 6/1995 | Jain et al. . |
| 5,548,962 | 8/1996 | Luger et al. ........................... 62/908 X |
| 5,551,257 | 9/1996 | Jain . |
| 5,601,634 | 2/1997 | Jain et al. .............................. 62/908 X |
| 5,737,941 | 4/1998 | Hsiung et al. ......................... 62/908 X |

*Primary Examiner*—Christopher Kilner
*Attorney, Agent, or Firm*—Young & Thompson

[57] ABSTRACT

Process and apparatus for the purification of a cryogenic fluid in liquid, diphase, gaseous or supercritical state, having boiling point Pe, with at least one of its impurities having a boiling point Pe', with Pe'>Pe. The process includes at least one step selected from the group comprised by:

a filtration step of at least one impurity in solid state, and an adsorption step of at least one impurity in liquid or gaseous state;

and in which there is recovered at least one portion of the cryogenic fluid at least partially purified.

11 Claims, 2 Drawing Sheets

PROCESS FOR THE PURIFICATION OF A CRYOGENIC FLUID BY FILTRATION AND/OR ADSORPTION

This application is a division of copending application Ser. No. 08/790,362, filed Jan. 28, 1997.

FIELD OF THE INVENTION

The present invention relates to the field of purification of cryogenic fluids and, more particularly, to a process and a device for the purification of a cryogenic fluid in liquid, gaseous, supercritical or diphase state with at least one of the impurities in a solid and/or liquid and/or gaseous state which it contains.

BACKGROUND OF THE INVENTION

At present, cryogenic fluids find use in numerous and various fields of industry. Thus, nitrogen, helium, neon, argon, deuterium, krypton, and xenon are at present used in the electronic field.

This field especially requires these compounds to be as pure as possible, which is to say stripped of most of their impurities, so as to avoid subsequent degradation of the electronic components by reaction with said impurities. By way of example, can be cited the use of ultra pure helium, as inert gas utilizable in constant temperature control of the support chips for integrated circuits forming memories or processors, or in the cooling of "wafers".

There is also an increase in demand in the electronic field as to the supply of ultra pure hydrogen.

Numerous processes for purification of cryogenic fluids, such as inert fluids, are known from the prior art, but these latter generally have several drawbacks or disadvantages, namely:

- they are not suitable for purification of cryogenic fluids no matter what their state, namely liquid, gas, supercritical and/or diphase, and therefore require heating and/or cooling steps, as the case may be, to bring the cryogenic fluid to be purified to a given temperature, at which the elimination of the impurities can be carried out;
- they require the use of costly adsorbents, for example of the getter type;
- the adsorbents used are not effective unless "hot", that is, at temperatures higher than 0° C., even at 100° C.;
- they are limited as to the quantity of cryogenic fluid that can be treated during a given period of time;
- they are limited to one type of cryogenic fluid, for example argon or helium, which is to say that the same process and/or the same device cannot be used to purify cryogenic fluids of different types;
- they are limited as to the impurities that can be eliminated by the use of adsorbents or catalysts which react only in a selective manner, which is to say with certain impurities and not others, with the result that a cryogenic fluid is only partially purified; for example, the conventional adsorbents or catalysts do not permit eliminating nitrogen impurities contained in helium.
- they generally comprise one or several oxidative catalytic steps so as to convert particularly the hydrogen and/or carbon monoxide impurities into water and/or carbon dioxide.

Thus, U.S. Pat. No. 3,996,082 discloses a process for the purification of gaseous argon from its oxygen impurity by means of a synthetic zeolite of type A.

U.S. Pat. No. 2,874,030 discloses itself a process for the purification of gaseous argon from its oxygen impurity, in which the oxygen is transformed into water by catalytic reaction with excess hydrogen; the water formed being then eliminated by dehydration.

EP-A-0 350 656 discloses moreover a process for the purification of an inert gas of its oxygen, carbon monoxide and hydrogen impurities, in which the carbon monoxide and the hydrogen are eliminated by catalytic oxidation at a temperature comprised between 150° C. and 250° C. in the presence of a first reduced copper-based catalyst, then a second oxidized copper-based catalyst, giving carbon dioxide and water, which are then eliminated by adsorption at ambient temperature on an adsorbent of the molecular sieve type.

Moreover, FR 9604955 discloses a process to supply a utilization conduit with ultra pure helium, in which helium is withdrawn in liquid phase or in supercritical phase from a storage reservoir, the helium is filtered by means of a steel cloth so as to retain solid impurities, the filtered helium is vaporized and is sent to the utilization conduit. It is recited in this document that the hydrogen and/or neon impurities dissolved in the liquid or supercritical helium are not retained.

FR 9507943 discloses itself a process of purification of inert gases, such as nitrogen and rare gases, of their oxygen and carbon monoxide impurities, by adsorption at a temperature below 30° C. on a specific adsorbent of the porous metallic oxide type; the hydrogen impurity is then eliminated by distillation.

Moreover, FR 9611271 relates to the purification of a cryogenic fluid, such as liquid nitrogen, liquid argon or liquid helium, of its hydrogen, carbon monoxide and/or oxygen impurities, by adsorption on a support of the type of alumina, silica, zeolite or titanium oxides supporting a metal, such as platinum, palladium, rhodium or iridium.

Moreover, U.S. Pat. No. 4,659,351 discloses a process in two steps for obtaining liquid helium, in which a gaseous flow consisting essentially of helium and nitrogen with several minor impurities is subjected to a cooling step so as to condense said minor impurities and nitrogen, which are then eliminated; the gaseous flow enriched in helium is then subjected to a PSA type process (pressure swing adsorption) or a process of adsorption by pressure variation, from which results a flow of relatively pure gaseous helium, which helium is then condensed to liquid helium. It will be easily understood that this process has numerous disadvantages and drawbacks, not only as to the cost of energy but also as to the purity of helium obtained. Thus, the requirement to use the steps of vaporization/liquefaction of helium is very costly from a point of view of energy and finance, and although the helium obtained will be relatively pure, it contains quantities of impurities too high to be used particularly for electronics.

SUMMARY OF THE INVENTION

The object of the present invention is therefore to provide a process and a device for the purification of cryogenic fluids no matter what their state, namely liquid, diphase, gaseous or supercritical, which will be less costly from the economic and energy standpoint than the processes and devices existing at present, which is suitable for the purification of different cryogenic fluids, which permits obtaining pure cryogenic fluids, which is to say free from at least their principal solid and/or liquid and/or gaseous impurities.

The invention thus relates to a process for the purification of a cryogenic fluid in liquid, diphase, gaseous or supercritical state, having a boiling point Pe, of at least one of its impurities having a boiling point Pe', with Pe'>Pe, comprising at least one purification step selected from the group comprised by:

- a step of mechanical filtration of at least one impurity in solid state,
- and a step of adsorption of at least one impurity in liquid or gaseous state,
- and in which there is recovered at least a portion of the cryogenic fluid at least partially purified.

In other words, the impurities in solid state (crystalline) contained in the cryogenic fluid to be purified are retained by mechanical filtration, whilst the impurities in liquid or in gaseous phase are adsorbed by means of at least one adsorbent material.

As the case may be, the process of the invention could comprise moreover one or several of the following characteristics:

- the cryogenic fluid is such that its boiling point Pe is less than $-100°$ C., preferably less than $-150°$ C., more preferably below $-240°$ C. (at a pressure of $10^5$ Pa);
- the cryogenic fluid to be purified is selected from the group comprised by helium, hydrogen, deuterium ($D_2$), krypton, xenon, neon and argon (there is understood by helium: helium and its isotopes $He^3$ and $He^4$);
- the cryogenic fluid to be purified is helium and the eliminated impurities are from the group comprised by hydrogen, neon, nitrogen, carbon monoxide, carbon dioxide, oxygen, argon, xenon, krypton, hydrocarbons and water;
- the cryogenic fluid to be purified is hydrogen and the impurities are from the group comprised by neon, nitrogen, carbon monoxide, carbon dioxide, oxygen, argon, xenon, krypton, hydrocarbons and water;
- the cryogenic fluid to be purified is neon and the impurities are from the group comprised by nitrogen, carbon monoxide, carbon dioxide, oxygen, argon, xenon, krypton, hydrocarbons and water;
- the mechanical filtration carried out by means of a metal or ceramic filter, or by means of adsorbent material used to eliminate impurities in the liquid or gaseous state. Thus, said adsorbent material can also serve as a filter so as to retain the particles and solid impurities (crystalline) contained in the cryogenic fluid to be purified; in this case, the steps of filtration and adsorption will be simultaneous.
- the adsorption of the impurities is carried out by means of an adsorbent chosen from the group comprised by active carbon, zeolites, silica gel or any other porous adsorbent permitting retaining effectively one or several types of soluble or gaseous impurities in the cryogenic fluid to be purified, for example, a carbon cloth.
- at least one mechanical filtration step is carried out upstream and/or downstream of at least one adsorption step and, preferably, upstream and downstream of the adsorption step. It is also possible to alternate several adsorption steps and several steps of filtration by using identical adsorption materials and filtration means, analogous or different in the different steps.
- the adsorbent used in the adsorption step of the impurities contained in the cryogenic fluid is subjected to at least one step of regeneration. This regeneration of the adsorbent material can be carried out for example by the following operative procedure:

stoving for several hours at a temperature of 100° C. to 150° C. of the adsorbent material, such as active carbon (only during the first use of the adsorbent material);

sweeping or purging the purifier with the help of an inert gas such as nitrogen, at ambient temperature and at atmospheric pressure;

and subsequently sweeping with the aid of the gas to be purified at ambient temperature and at atmospheric pressure.

After this double sweeping, the purification system is adapted to carry out a new purification phase.

The invention also relates to a device for practicing the process according to the invention, characterized in that it comprises a purifying zone of the cryogenic fluid to be purified, which purifying zone comprises at least one mechanical filter and/or at least one adsorbent bed, supply means for the cryogenic fluids to be purified to said purification zone, and means for recovering purified cryogenic fluid.

As the case may be, the device of the invention can also comprise:

- storage means for the purified cryogenic fluid;
- conduit means for bringing the purified cryogenic fluid to a utilization site;
- means for regenerating the adsorbent material, permitting regeneration of said adsorbent material, for example according to the operative condition mentioned above.

The process of the invention can thus preferably be used to purify a cryogenic liquid, which will be in the state:

- liquid or cooled, which is to say at a temperature below its boiling point,
- gaseous, which is to say at a temperature higher by several degrees than its liquefaction temperature or boiling point, for example being at a temperature between 5° C. and 20° C. above its boiling point.
- diphasic, which is to say in the form of a liquid/gas mixture, hence at a temperature substantially equal to the boiling point, or fluctuating about said boiling point,
- or supercritical, for example in the case of helium, at a temperature of about $-268°$ C. for a pressure of $2,275.10^5$ Pa.

The advantage of the invention resides in the fact that it permits ultra purification of the cryogenic fluids having a boiling temperature, at atmospheric pressure, below $-100°$ C., preferably below $-150°$ C., more preferably below $-240°$ C., such as helium, krypton, xenon, argon, hydrogen, deuterium ($D_2$), or neon, from at least one of their impurities having a boiling point higher than that of said cryogenic fluid, whether in the solid and/or liquid and/or gaseous state, by means of mechanical filtration steps and/or adsorption of said impurities.

The process of the invention will preferably be practiced over a temperature range comprised between about $-273°$ C. and $-240°$ C., and for a pressure range comprised between $10^5$ Pa and $30.10^5$ Pa, preferably between $10^5$ Pa and $10.10^5$ Pa.

By way of example, the boiling points or temperatures, at atmospheric pressure, of different compounds are given in Table 1 as follows:

TABLE 1

| Compound | Pe (°C.) |
|---|---|
| Argon | −185.80 |
| Nitrogen | −195.60 |
| Xenon | −108.10 |
| Krypton | −153.35 |
| Neon | −246.05 |
| Oxygen | −182.97 |
| Helium | −268.90 |
| Hydrogen | −252.77 |
| Methane | −161.52 |
| Propane | −42.04 |
| Ethane | −88.68 |
| $CO_2$ | −78.50 |
| NO | −151.75 |
| $CF_4$ | −127.94 |
| $D_2$ | −249.58 |

BRIEF DESCRIPTION OF THE DRAWINGS

The present invention will now be described in more detail with the help of examples given by way of illustration, but not limiting the invention, with reference to the accompanying drawings.

DETAILED DESCRIPTION OF THE INVENTION

Figure 1:
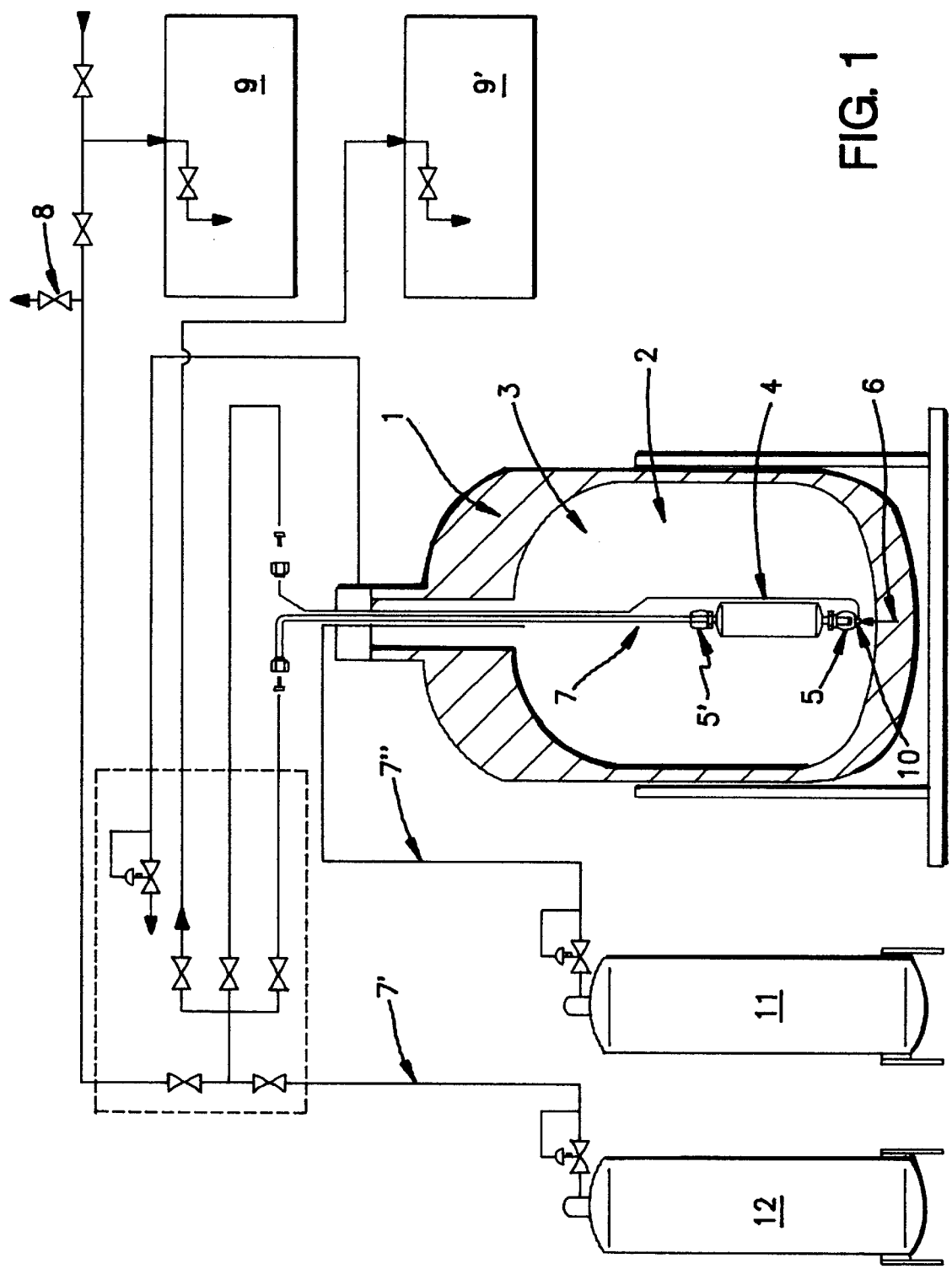
FIG. 1 shows a conventional experimental device which can be used to carry out the tests recited hereafter.

In FIG. 1 is shown a vacuum insulated reservoir 1 so as to avoid or minimize any entry of heat, containing liquid helium 2 and a helium sky 3. In this experimental device, the purification zone for helium polluted by impurities is constituted by a cartridge 4 containing an adsorbent material, here active carbon, adapted to adsorb the impurities of the liquid or gas type and two mechanical filters 5 and 5', provided respectively upstream and downstream of said purification cartridge 4, said filters 5, 5' being adapted to stop the impurities of solid type (crystalline).

A mechanical filter is conventionally provided by compression of a metallic powder, such as a powder of a metal or metal alloy, preferably stainless, and embodied as a disc of the compacted structure obtained. It is possible to vary the geometry of the disc or filter obtained by acting particularly on its diameter, its thickness and its porosity. By way of example, can be cited filters or metallic sinters sold by the company PORAL or by the company METAFRAN. Certain sealing joints can also be provided for such a metallic mechanical filter, for example the joint VCR (surface sealed connections for metallic joints) produced by the CAJON company.

Liquid polluted helium 2 enters the purification zone in the direction indicated by arrow 6, which is to say from bottom to top. The solid impurities are all first stopped by the filter 5, then the liquid impurities are adsorbed in the purification cartridge 4 by the adsorbent material, for example active carbon, and to finish, the solid particles which can be generated by attrition of the adsorbent material are stopped by the filter 5'.

The ultra pure liquid helium thus obtained is brought via the conduit 7 to the analyzers 9 and 9' or, as the case may be, discharged to the air at 8.

According to this arrangement, purification is effected of helium in liquid phase. However, to test the efficacy of the process of the invention on gaseous helium, the same process is conducted but by using this time the purification region in the gaseous sky 3 such that the inlet opening 10 for helium in the filter 5 is located above the level of the liquid helium, hence in the gaseous sky, from which is thus removed gaseous helium to be purified.

In all cases, bringing the gaseous or liquid helium through successively the filter 5, the purification cartridge 4, the filter 5' and the passage 7 is effected in a conventional manner, by increasing the pressure exerted in the receptacle 1.

This experimental system is connected via conduits 7 and 7' to a reservoir 12 containing ultra pure helium permitting purging, which is to say cleaning, the purification zone comprising the filters 5 and 5' and the purification cartridge 4, in particular prior to or after a purification step.

Moreover, another reservoir 11 contains, itself, a helium polluted by known quantities of impurities adapted to pollute artificially the liquid or gaseous helium contained in the receptacle 1 with known quantities of pollutants and, in this way, to test the effectiveness of the purification process of the invention.

Figure 2:
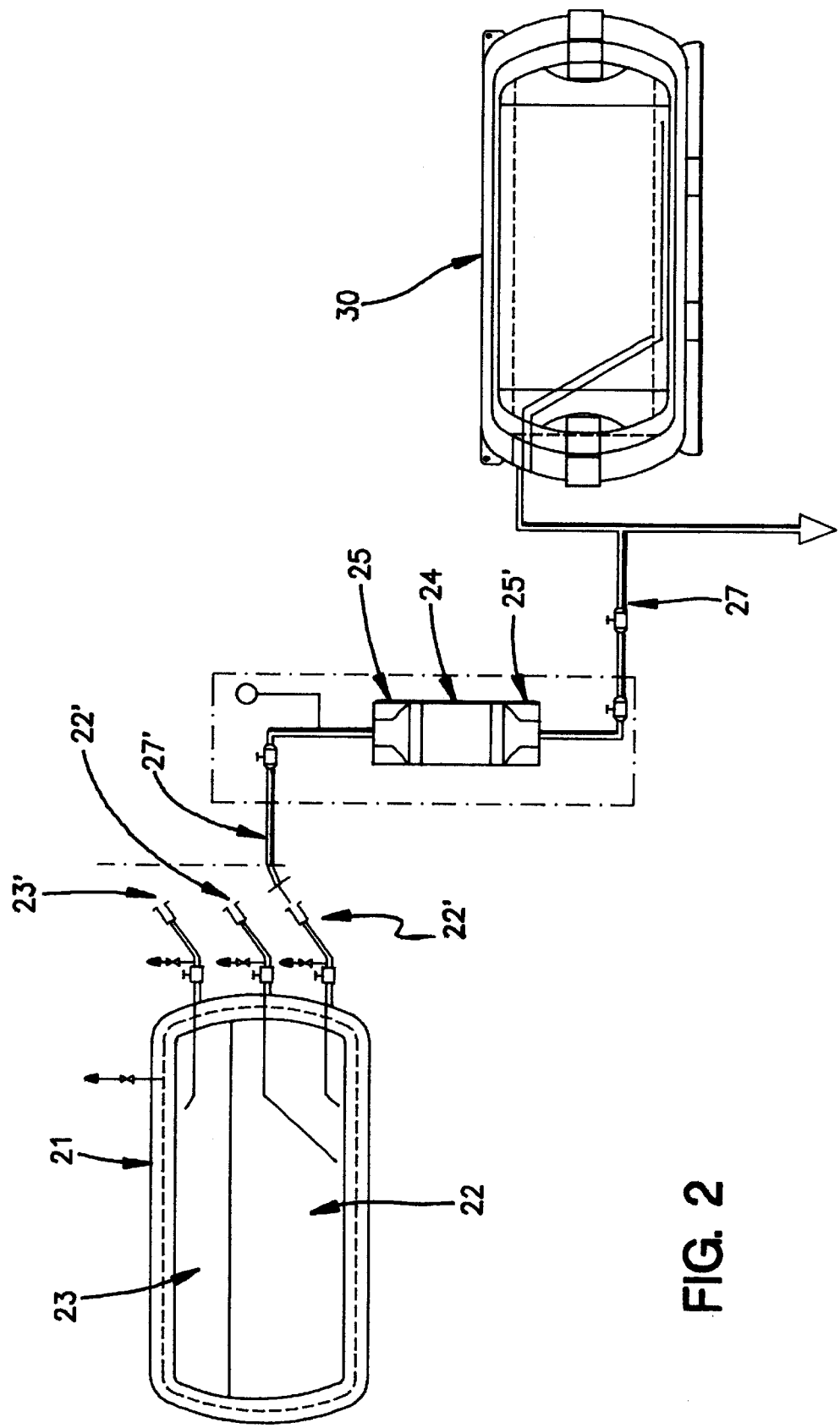
FIG. 2 shows an industrial device for practicing the process according to the invention.

In FIG. 2 is shown an industrial purification device for liquid helium. Liquid helium 22 surmounted by a gaseous helium sky 23 is contained in an insulated reservoir 21, for example a storage reservoir or the tank of a truck.

Gaseous helium 23 or liquid helium 22 is withdrawn from the insulated reservoir 21 via withdrawal means 23' or 22', respectively, and brought, via a conduit 27', to a purification zone comprising a first filter 25, located upstream of a purification cartridge 24 containing an adsorbent material, such as active carbon or any other suitable porous adsorbent material permitting adsorbing one or several impurities in liquid or gaseous phase, which purification cartridge 24 is located upstream of a second filter 25'.

Polluted helium from the reservoir 21 is thus purified in the purification zone and the ultra pure helium obtained is brought, via the conduit 27, to an insulated reservoir 30 for ultra pure helium or, as the case may be, to a utilization site (not shown).

It will be easily understood that the handling of the cryogenic fluids is a delicate operation and that, to ensure optimum purification, it is necessary to be careful that the assembly of the device using the present invention be correctly insulated, so as to avoid, or even to eliminate, any entry of troublesome heat; vacuum insulation is preferred.

Moreover, as will be seen in the following illustrative examples, one could also, as the case may be, pass from one to the other, namely the two filters 25 and 25' and obtain nevertheless an ultra pure cryogenic fluid responding to the desired requirements, particularly to the requirements in the electrical field. In this case, it is the porous adsorbent material which ensures both the mechanical filtration of the solid particles and the adsorption of the impurities in liquid or gaseous state.

So as to permit the regeneration of the adsorbent material located in the purification cartridge and the filters which retain the solid impurities, it is necessary or desirable to subject the purification zone to a regeneration process, for example a conventional process using a return of the purification zone to ambient temperature by means of sweeping said purification zone with an inert gas, such as nitrogen, so as to sublime and/or desorb the adsorbed and/or retained pollutants, followed by a cleansing, which is to say a sweeping, with first ultra pure gaseous helium, then ultra pure liquid helium, before any new purification phase.

EXAMPLES

In the following examples, the quantities of impurities present in the cryogenic fluid to be purified are determined with the aid of analyzers now on the market. Thus, the quantities of carbon monoxide and hydrogen impurity are measured by means of an RGA3 chromatograph sold by TRACE ANALYTICAL company, whose detection level is of the order of 1 ppb for carbon monoxide and 5 ppb for hydrogen (ppb=part per billion by volume), and the quantity of oxygen impurity is measured by means of an analyzer of the OSK type sold by the company OSAKA SANSO KOGYO, which has a detection level of: 1 ppb for oxygen.

For a more exhaustive analytical procedure, the other impurities (nitrogen, neon, carbon dioxide . . . ) can be easily detected by means of suitable analyzers, such as an analyzer of the APIMS (Atmospheric Pressure Ion Mass Spectrometry) type whose detection level for these impurities is below 1 ppb.

A conventional device that can carry out the different tests is shown in FIG. 1.

Example 1

In this example, the purification of liquid hydrogen from its impurities $O_2$, CO and $H_2$ has been carried out solely by mechanical filtration by means of a sintered body, comprised of a VCR joint provided with a porous metallic filter (thickness 2.5 mm, porosity 2 $\mu$m) sold by the SWAGELOCK company.

At the temperature of liquid helium, the impurities other than hydrogen are in solid form, whilst a fraction of the hydrogen is still in liquid phase.

Before purification, the liquid helium contains about 1 ppm (part per million by volume) of carbon monoxide, about 5 ppm oxygen and about 2 ppm hydrogen, and other solid impurities in the form of traces, namely carbon dioxide, water, nitrogen and neon.

After purification, the purified helium contains less than 1 ppb of carbon monoxide and less than 1 ppb oxygen; by contrast, a residue of from 100 ppb to several hundreds ppb hydrogen is detected downstream of the filter (as a function of the operative conditions of pressure and temperature).

The purification of the liquid helium on a mechanical filter thus has its limits as to the hydrogen impurity. Nevertheless, such a filtration is sufficient when the helium to be purified contains no impurities of the hydrogen type, given that all the other impurities are stopped.

Example 2

This example is in all ways analogous to the preceding example except that the mechanical filtration (filter or metallic sinter) is associated with an adsorption, particularly hydrogen on a suitable adsorbent, here active carbon.

In this case, the use of mechanical filtration coupled with adsorption permits obtaining ultra pure liquid helium, no longer containing this time, contrary to the preceding example, impurities of the hydrogen type. Thus, this hydrogen impurity is adsorbed by the active carbon.

The ultra pure helium thus obtained all together meets the requirements and necessities of use for electronic purposes, which is to say that the purified liquid helium contains less than 1 ppb of these various impurities.

It is to be noted that the adsorption of the impurities soluble in liquid helium, for example hydrogen, can be carried out upstream and/or downstream of the mechanical filtration. Preferably, mechanical filters are disposed on opposite sides of the adsorbent material.

Example 3

This example is like the preceding examples except that the elimination of the impurities contained in the liquid helium is effected only by means of a bed of particles of an adsorbent material, here again a bed of active carbon; in other words, the metallic mechanical filters have been omitted.

In a surprising way, there is obtained, as in Example 2, ultra pure liquid helium and this despite the omission of the mechanical filters. The microporous active carbon therefore permits not only adsorbing liquid or gaseous impurities, but also filtering, which is to say retaining mechanically, the solid or crystallized impurities (adsorption and filtration taking place simultaneously).

Example 4

This example is like Example 2, except that the helium to be purified contains not only carbon monoxide, hydrogen and oxygen impurities, but also other impurities, namely: water, carbon dioxide (1 ppm), nitrogen (1 ppm) and neon (1 ppm).

The liquid helium after purification contains, here also, less than 1 ppb of its different pollutants and the impurities $H_2O$, $CO_2$, $N_2$ and Ne are totally eliminated.

Example 5

This example is like Example 2, except that the adsorbent (active carbon) is replaced by a carbonized cloth, for example of the type Actitex CS 1501 sold by the ACTITEX company.

The results obtained are identical to those of Example 2.

Here again, there is obtained an ultra purification of the liquid helium when mechanical filtration and adsorption by the carbonated cloth are combined.

Example 6

This example is like Example 2, except that the cryogenic fluid to be purified is neon (Te=-246° C.) in liquid phase, which is polluted with the following impurities having higher boiling points than that of neon: nitrogen (4 ppm), oxygen (1 ppm), carbon dioxide (2 ppm) and ethane (1 ppm).

After purification, the ultra pure neon obtained contains undetectable quantities of these different impurities (relative to the analyzers used).

The process of the invention is thus applicable to the purification of neon.

Example 7

This example is identical to Example 2, except that the cryogenic fluid to be purified is krypton (Te=-153° C.,) in liquid phase, which is polluted with the following impurities having boiling points higher than that of krypton: water (3 ppm), ethane (2 ppm) and carbon dioxide (2 ppm).

After purification, the ultra pure krypton obtained, contains undetectable quantities of these various impurities.

The process of the invention is hence applicable to the purification of krypton.

Example 8

This example is identical to Example 2, except that the cryogenic fluid to be purified is xenon (Te=-108° C.) in liquid phase, which is polluted with the following impurities having boiling points higher than that of xenon: water (3 ppm), $CO_2$ (2 ppm), ethane (1 ppm).

After purification, the ultra pure xenon obtained contains undetectable quantities of these various impurities.

The process of the invention is hence applicable to the purification of xenon.

We claim:

1. Process for the purification of hydrogen or deuterium in liquid, diphasic, gaseous or supercritical phase by removal of its carbon dioxide and water impurities, and at least one other of its impurities selected from the group consisting of neon, nitrogen, carbon monoxide, oxygen, argon, krypton, xenon, and hydrocarbons, the process comprising the steps of:

filtering at least one impurity in solid state;

adsorbing at least one impurity in liquid or gaseous state; and recovering at least a portion of purified hydrogen or deuterium, said purified hydrogen or deuterium containing no more than 1 ppb of said impurities.

2. Process according to claim 1, wherein the filtering step is carried out by passing hydrogen or deuterium through one of a metal or ceramic filter or an adsorbent material.

3. Process according to claim 1, wherein the adsorption step is carried out on an adsorbent material selected from the group consisting of active carbon, carbonized cloth, zeolites, silica gel, and mixtures thereof.

4. Process according to claim 1, further comprising at least one mechanical filtration step carried out upstream and/or downstream of the adsorption step.

5. Process according to claim 1, wherein the purification of hydrogen or deuterium is carried out at a pressure ranging between $1 \times 10^5$ Pa and $30 \times 10^5$ Pa.

6. Process according to claim 5, wherein the purification of hydrogen or deuterium is carried out at a pressure ranging between $1 \times 10^5$ Pa and $10 \times 10^5$ Pa.

7. Process according to claim 3, wherein the adsorbent used in the adsorption step of the impurities contained in hydrogen or deuterium is subjected to a regeneration step.

8. Apparatus for the purification of hydrogen or deuterium in liquid, diphasic, gaseous or supercritical phase by removal of its carbon dioxide and water impurities, and at least one other of its impurities selected from the group consisting of neon, nitrogen, carbon monoxide, oxygen, argon, krypton, xenon, and hydrocarbons, the apparatus comprising:

a source of polluted hydrogen or deuterium;

a purification zone fluidly connected to said source of polluted hydrogen or deuterium; said purification zone comprising at least one mechanical filter and at least one adsorbent bed; and recovery means fluidly connected to said purification zone for recovering at least a portion of purified hydrogen or deuterium containing no more than 1 ppb of said impurities from said purification zone.

9. Apparatus according to claim 8, further comprising storage means for storing purified hydrogen or deuterium.

10. Apparatus according to claim 8, further comprising conduit means for conveying purified hydrogen or deuterium toward a utilization site.

11. Apparatus according to claim 8, further comprising means for regenerating the adsorbent bed.

* * * * *